United States Patent
Akebono et al.

(10) Patent No.: US 8,355,848 B2
(45) Date of Patent: Jan. 15, 2013

(54) HYDRAULIC CONTROL DEVICE AND METHOD FOR AUTOMATIC TRANSMISSION

(75) Inventors: Hiromichi Akebono, Machida (JP); Osamu Sato, Fujisawa (JP); Akio Nonomura, Numazu (JP)

(73) Assignee: Jatco Ltd, Fuji-shi (JP)

( * ) Notice: Subject to any disclaimer, the term of this patent is extended or adjusted under 35 U.S.C. 154(b) by 909 days.

(21) Appl. No.: 12/470,251

(22) Filed: May 21, 2009

(65) Prior Publication Data

US 2009/0306868 A1    Dec. 10, 2009

(30) Foreign Application Priority Data

Jun. 6, 2008  (JP) ................................. 2008-148896

(51) Int. Cl.
*G06F 17/00* (2006.01)
(52) U.S. Cl. ................. 701/51; 701/55; 701/56; 701/64
(58) Field of Classification Search .......... 701/1, 54, 701/55, 60, 64, 66, 67, 51, 56; 477/34, 115, 477/116, 143, 166, 174, 175, 176; 192/103 F, 192/103 R, 30 R, 82 R, 85.01, 3.51, 3.54, 192/3.55, 3.57
See application file for complete search history.

(56) References Cited

U.S. PATENT DOCUMENTS

| 5,385,511 A | 1/1995 | Iizuka |
| 5,520,586 A | 5/1996 | Brown et al. |
| 5,707,316 A * | 1/1998 | Tanahashi et al. ............. 477/116 |
| 5,733,220 A * | 3/1998 | Iizuka ............................ 477/116 |
| 5,913,747 A * | 6/1999 | Minowa et al. ................ 477/117 |
| 5,938,563 A | 8/1999 | Nishio et al. |
| 7,317,979 B2 * | 1/2008 | Goka .............................. 701/60 |

FOREIGN PATENT DOCUMENTS

| EP | 0 742 392 A1 | 11/1996 |
| JP | 02-245568 A | 10/1990 |
| JP | 8-326897 A | 12/1996 |
| JP | 10-196783 A | 7/1998 |

\* cited by examiner

*Primary Examiner* — Tuan C. To
*Assistant Examiner* — Dale W Hilgendorf
(74) *Attorney, Agent, or Firm* — Foley & Lardner LLP

(57) ABSTRACT

There is provided a hydraulic control device for controlling a hydraulic pressure supplied to a vehicle start-up engagement element in an automatic transmission when a shift lever is moved from a non-drive range position to a drive range position. The hydraulic control device has a target pressure setting section that sets, based on an input torque of the automatic transmission, a target value of hydraulic pressure supplied to the vehicle start-up engagement element at the completion of engagement of the vehicle start-up engagement element and corrects the target value periodically based on the transmission input torque until the completion of engagement of the vehicle start-up engagement element and a hydraulic pressure control section that controls the hydraulic pressure in such a manner that the hydraulic pressure supplied to the vehicle start-up engagement element reaches the corrected target value at the completion of engagement of the vehicle start-up engagement element.

6 Claims, 5 Drawing Sheets

HYDRAULIC CONTROL DEVICE AND METHOD FOR AUTOMATIC TRANSMISSION

BACKGROUND OF THE INVENTION

The present invention relates to a hydraulic control device and method for an automotive transmission.

Japanese Laid-Open Patent Publication No. H08-326897 discloses an automatic vehicle for a vehicle that has a hydraulic control device configured to, when a shift lever is moved from a neutral range position (N range position) to a drive range position (D range position), detect an engine speed of the vehicle at the time of D range selection and set a rate of increase of hydraulic pressure supplied to engage one of frictional engagement elements of the transmission for vehicle start-up (referred to as a "vehicle start-up engagement element") in accordance with the detected engine speed.

SUMMARY OF THE INVENTION

In general, the engine idling speed is set lower in D range than in N range in order to prevent excessive creep force. The engine speed thus decreases by the difference in engine idling speed when the shift lever is moved from the N range position to the D range position. Further, the engine idling speed is set higher in N range under cold engine conditions than under normal conditions in order to promote engine warm-up. This leads to a greater difference in engine idling speed, i.e., a greater amount of decrease in engine speed when the shift lever is moved from the N range position to the D range position under cold engine conditions.

The above-disclosed conventional hydraulic control device does not consider the case where the engine speed decreases after the setting of the hydraulic pressure increase rate of the vehicle start-up engagement element. In view of the fact that the amount of torque required at the completion of engagement of the transmission engagement element decreases with the engine speed, the supply of hydraulic pressure to the vehicle start-up engagement element may become excessive during the lapse of a predetermined engagement time under the circumstance where the engine speed decreases after the setting of the hydraulic pressure increase rate. There occurs a shock upon engagement of the vehicle start-up engagement element due to such excessive hydraulic pressure supply.

It is accordingly an object of the present invention to provide a hydraulic control device for an automatic transmission, capable of engaging a vehicle start-up engagement element of the transmission properly, without causing an engagement shock, even if the engine speed changes during engagement of the vehicle start-up engagement element.

According to an aspect of the present invention, there is provided a hydraulic control device for an automatic transmission, the automatic transmission having a vehicle start-up engagement element hydraulically engaged for vehicle start-up when a shift lever is moved from a non-drive range position to a drive range position, the hydraulic control device comprising: a target pressure setting section that, when the shift lever is moved from the non-drive range position to the drive range position, calculates a target value of hydraulic pressure supplied to the vehicle start-up engagement element at the completion of engagement of the vehicle start-up engagement element based on an input torque of the automatic transmission and corrects the target value periodically based on the transmission input torque until the completion of engagement of the vehicle start-up engagement element; and a hydraulic pressure control section that controls the hydraulic pressure in such a manner that the hydraulic pressure supplied to the vehicle start-up engagement element reaches the corrected target value at the completion of engagement of the vehicle start-up engagement element.

According to another aspect of the present invention, there is provided a hydraulic control method for an automatic transmission, the automatic transmission having a vehicle start-up engagement element hydraulically engaged for vehicle start-up when a shift lever is moved from a non-drive range position to a drive range position, the hydraulic control method comprising: when the shift lever is moved from the non-drive range position to the drive range position, setting a target value of hydraulic pressure supplied to the vehicle start-up engagement element at the completion of engagement of the vehicle start-up engagement element based on an input torque of the automatic transmission and correcting the target value periodically based on the transmission input torque until the completion of engagement of the vehicle start-up engagement element; and controlling the hydraulic pressure in such a manner that the hydraulic pressure supplied to the vehicle start-up engagement element reaches the corrected target value at the completion of engagement of the vehicle start-up engagement element.

The other objects and features of the present invention will also become understood from the following description.

DESCRIPTION OF THE EMBODIMENTS

The present invention will be described in detail below with reference to the drawings.

Figure 1:
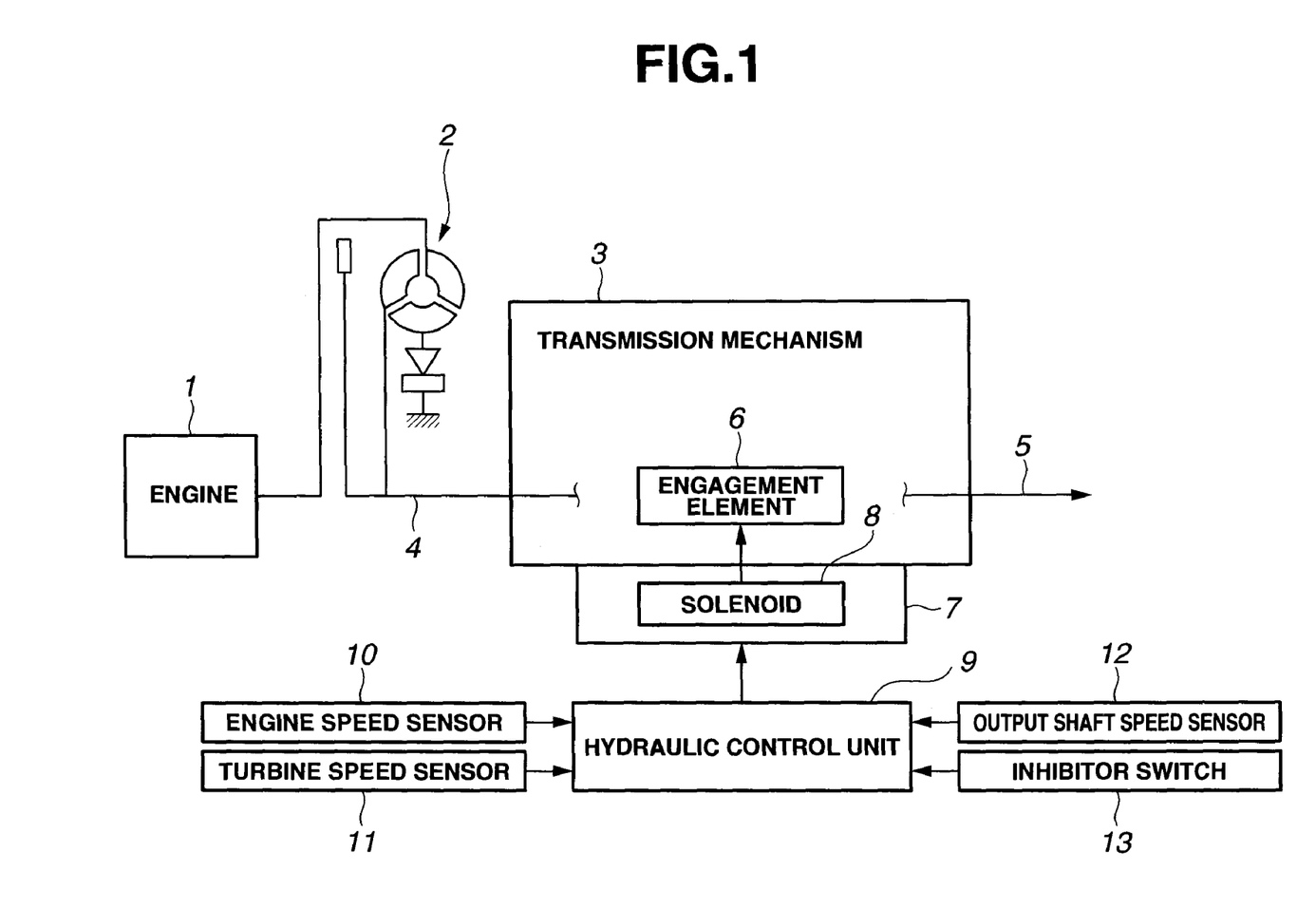
FIG. 1 is a schematic view of an automatic transmission with a hydraulic control device according to one embodiment of the present invention.

As shown in FIG. 1, an automotive vehicle according to one exemplary embodiment of the present invention includes an engine 1, an automatic transmission having a torque converter 2, a transmission mechanism 3 and a hydraulic control device equipped with a hydraulic valve circuit 7 and a hydraulic control unit 9, an engine speed sensor 10, a turbine speed sensor 11, a transmission output shaft speed sensor 12 and an inhibitor switch 13. Although not so shown in the drawings, the engine 1 has a throttle capable of increasing its opening degree from full-close to full-open in response to driver's accelerator pedal operations so as to adjust the output of the engine 1 according to the throttle opening degree.

The transmission mechanism 3 has an input shaft 4 connected to an output shaft of the engine 1 via the torque converter 2, an output shaft 5 located coaxially with the input shaft 4, front and rear planetary gear trains disposed on the input and output shafts 4 and 5 and a plurality of hydraulically operable engagement elements (such as hydraulic clutches and brakes) 6 engaged and disengaged selectively to lock and release sun gears, ring gears and planet carriers of the planetary gear trains and thereby establish a torque transmission path for transmitting the engine torque from the input shaft 4 to the output shaft 5 in accordance with a selected gear range. In the following description, one of the transmission engagement elements 6 engaged at the time of vehicle start-up (called a vehicle start-up engagement element) specifically refers to, but is not limited to, a start clutch for the sake of simplicity. The transmission mechanism 3 further includes a shift lever and a manual shaft rotated in synchronization with the shift lever.

The hydraulic valve circuit 7 has a plurality of hydraulic passages provided with pressure regulator valves and a solenoid 8 driven under the control of the hydraulic control unit 9 to operate the pressure regulator valves and regulate a supply of hydraulic pressure to the transmission engagement elements 6 for selective engagement/disengagement of the transmission engagement elements 6. In a driving state of the vehicle, these pressure regulator valves are operated so as to supply hydraulic pressure only to any of the transmission engagement elements 6 required to be engaged for a desired gear ratio.

The engine speed sensor 10, the turbine speed sensor 11 and the transmission output shaft speed sensor 12 are arranged to detect a rotation speed Ne of the engine output shaft (referred to as an "engine speed Ne"), a rotation speed of the transmission input shaft 4 (referred to as a "turbine speed Nt") and a rotation speed of the transmission output shaft 5 (referred to as an "transmission output shaft speed No"), respectively. The inhibitor switch 13 is arranged on the manual shaft of the transmission to detect a selected position of the shift lever (i.e. selected gear range of the transmission).

The hydraulic control unit 9 determines a command value of the hydraulic pressure supplied to the transmission engagement element 6 based on the outputs from the engine speed sensor 10, the turbine speed sensor 11, the transmission output shaft speed sensor 12 and the inhibitor switch 13 and outputs a command to control the pressure regulating operations of the hydraulic valve circuit 7 according to the hydraulic pressure command value.

Figure 2:
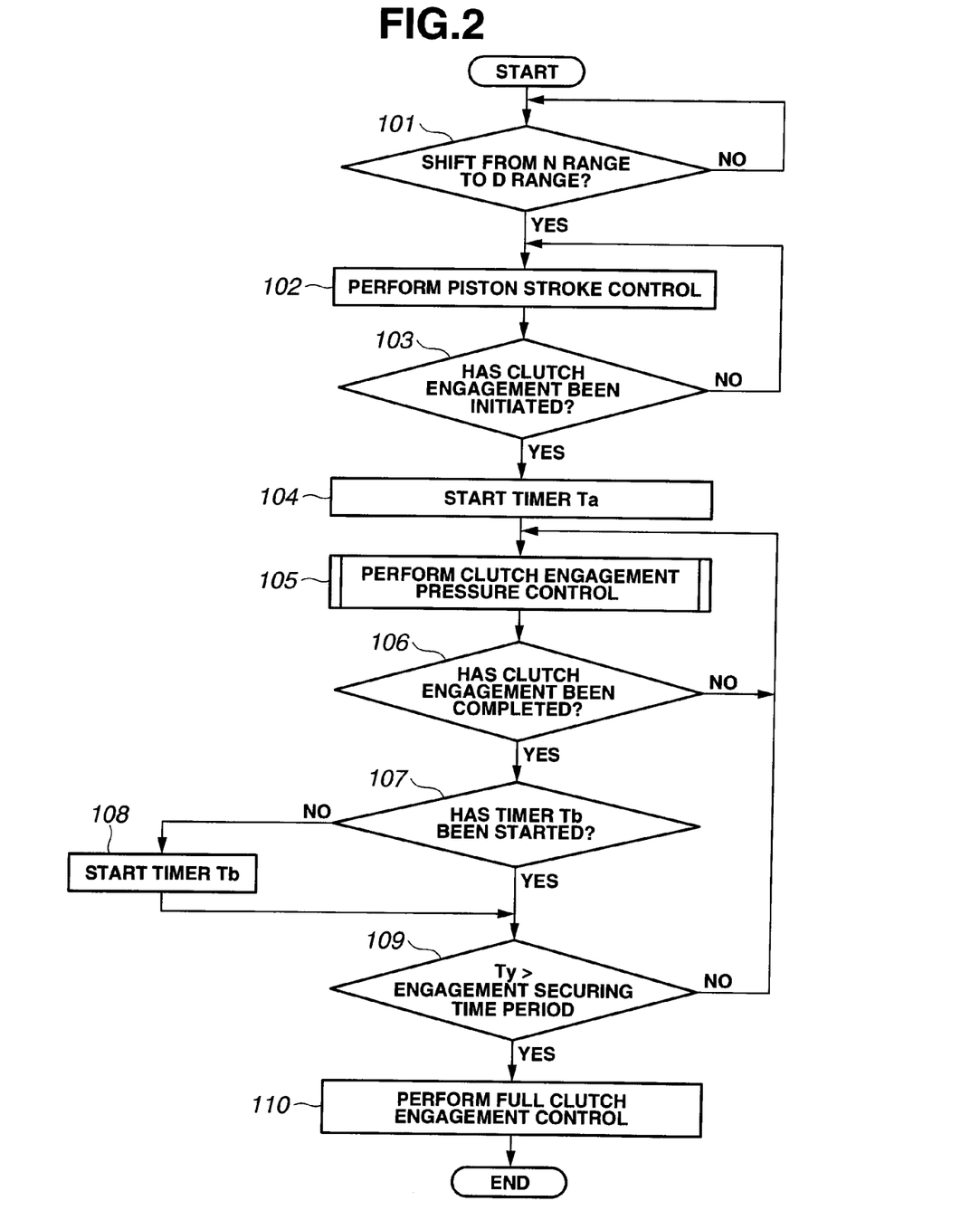
FIG. 2 is a flowchart for a main control routine of the hydraulic control device according to one embodiment of the present invention.
Figure 3:
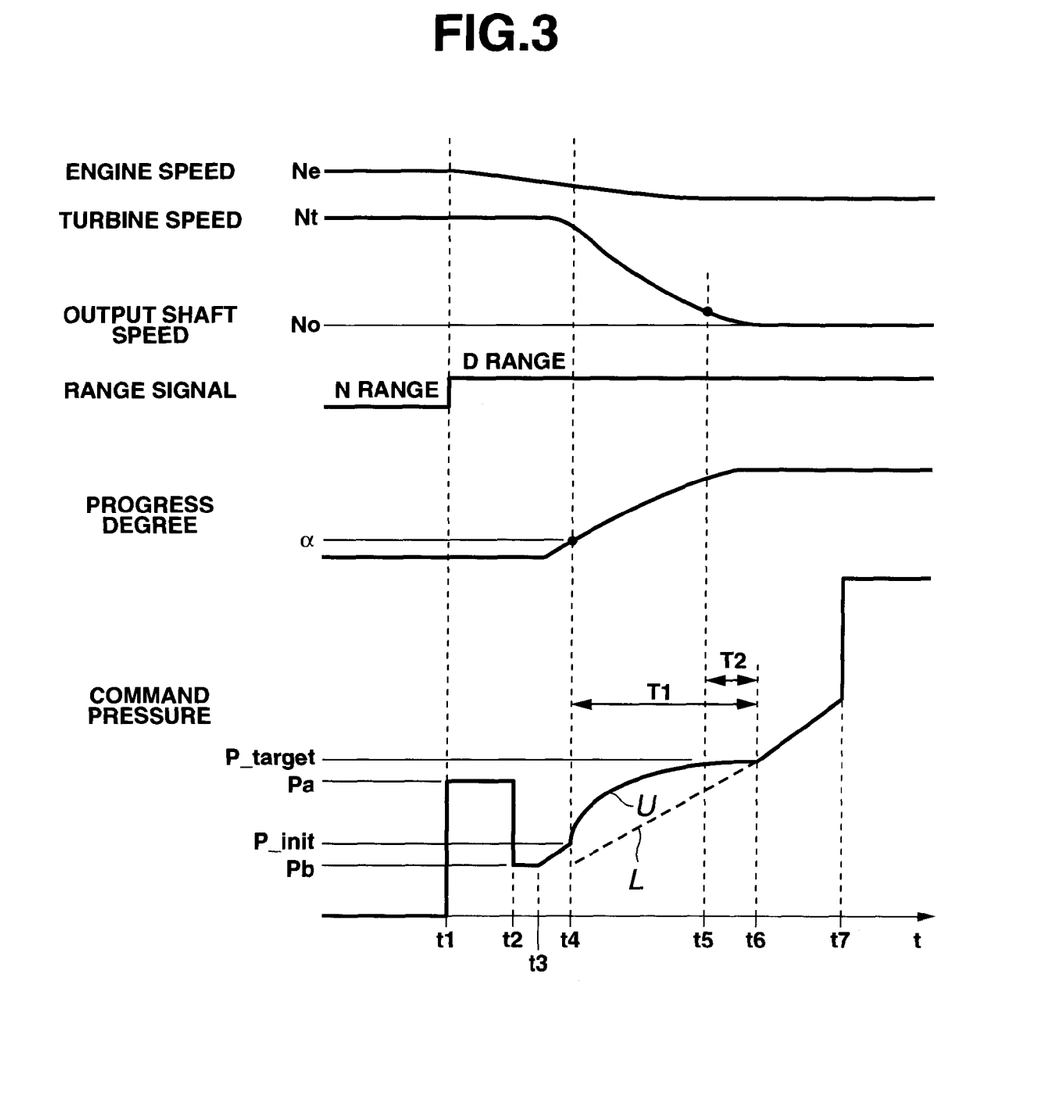
FIG. 3 is a time chart for the main control routine of the hydraulic control device according to one embodiment of the present invention.

In the present embodiment, the hydraulic control unit 9 performs a clutch engagement control process to control the hydraulic pressure supplied to the start clutch (occasionally simply referred to as "clutch pressure") and thereby engage the start clutch as shown in FIGS. 2 and 3 when the shift lever is moved from a non-drive range position e.g. N range position to a drive range position e.g. D range position.

At step S101, the hydraulic control unit 9 judges whether the shift lever has been moved from the N range position to the D range position, i.e. whether the D range has been selected, based on the range signal from the inhibitor switch 13. If Yes at step S102, the control goes to step S102.

At step S102, the hydraulic control unit 9 starts a piston stroke control operation to control the stroke of a piston provided in the hydraulic valve circuit 7 for engagement/disengagement of the start clutch. Herein, the piston is being biased by a return spring in a direction that disengages the start clutch.

In the piston stroke control operation, the hydraulic control unit 9 first holds the clutch pressure command value at a precharge value Pa until a first predetermined time period has elapsed from a time t1 of selection of the D range. This makes it possible to charge hydraulic fluid in the hydraulic passage to the start clutch for improvement in the hydraulic control response for engagement of the start clutch. The hydraulic control unit 9 next sets the clutch pressure command value to a given value Pb, which is lower than the precharge value Pa, at a time t2 after the lapse of the first predetermined period from the time t1 and holds the clutch pressure command value at the given value Pb for a second predetermined time period. At a time t3 after the lapse of the second predetermined time period from the time 2, the hydraulic control unit 9 starts increasing the clutch pressure command value at a given gradient and thereby causes a stroke of the piston in a direction that engages the start clutch against a biasing force of the return spring.

At step S103, the hydraulic control unit 9 judges whether the engagement of the start clutch has been initiated with the progress of the piston stroke control operation. In the present embodiment, the hydraulic control unit 9 determines a degree of progress of shift of the automatic transmission (i.e. a degree of progress of engagement of the start clutch) according to the following equation (1) based on the engine speed Ne, the turbine speed Nt, the transmission output shaft speed No and the gear ratio and, when the determined shift progress degree is greater than a threshold value α, judges that the engagement of the start clutch has been initiated.

$$\text{Shift progress degree} = (Ne-Nt)/\{(Ne-No)\times\text{gear ratio}\} \quad (1)$$

If Yes at step S103, the control goes to step S104. If No at step S103, the control goes back to step S102.

At step S104, the hydraulic control unit 9 starts a timer Ta to set a target engagement period T1 from a time t4 of initiation to a time t6 of completion of engagement of the start clutch.

Figure 4:
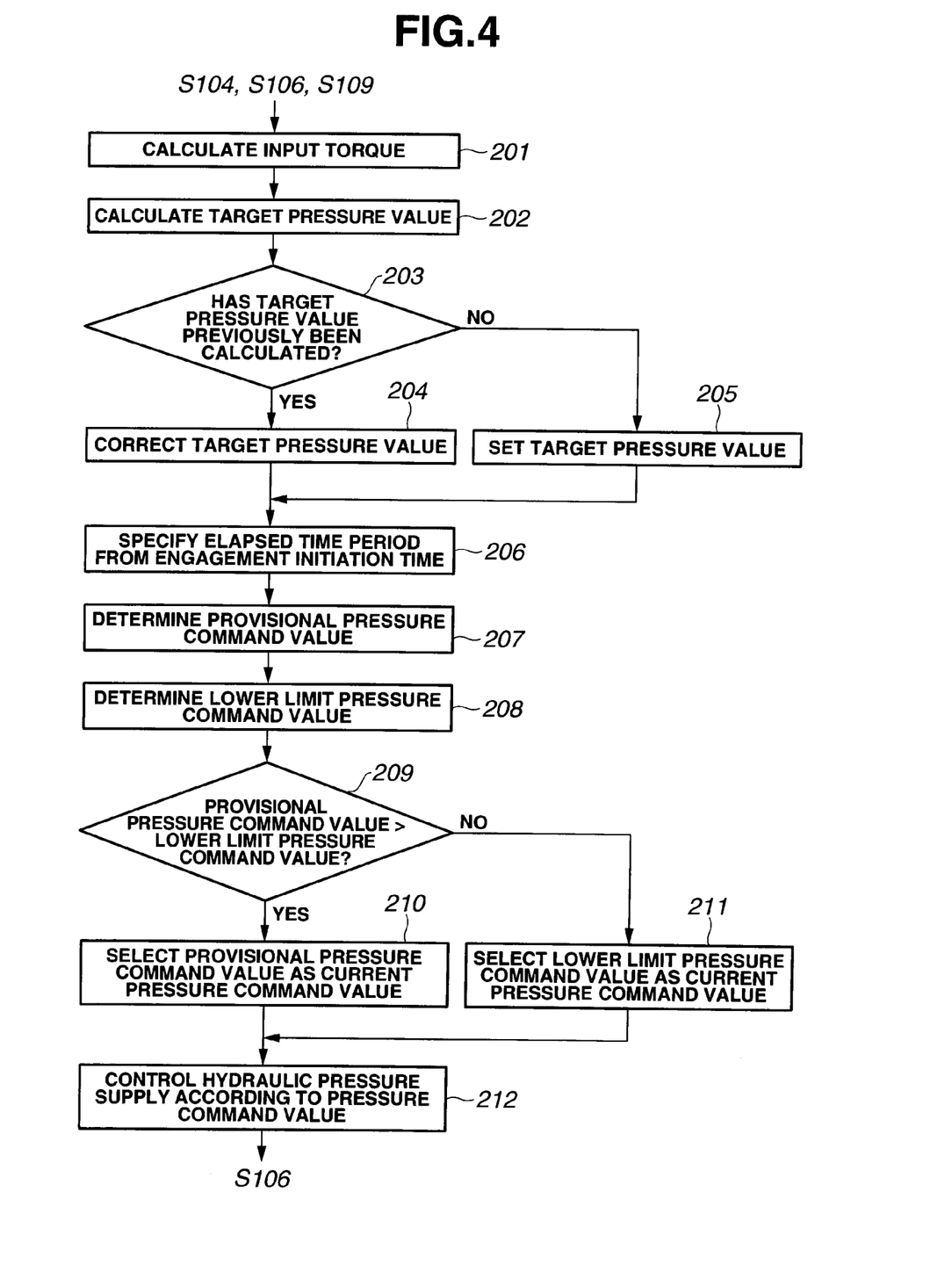
FIG. 4 is a flowchart for an engagement pressure control routine of the hydraulic control device according to one embodiment of the present invention.

At step S105, the hydraulic control unit 9 performs an engagement pressure control operation to determine the clutch pressure command value as shown in FIG. 4. This engagement pressure control operation (steps S201 to S212) is performed periodically and repeatedly until judging that the engagement of the start clutch has been completed in step S106 and until confirming the lapse of a predetermined engagement securing time period T2 in step S109.

At step S201, the hydraulic control unit 9 calculates an input torque of the transmission (a torque inputted to the transmission input shaft 4) according to the following equation (2)

$$\text{Input torque} = \tau Ne^2 t \quad (2)$$

where τ is the capacity coefficient of the torque converter 2 (τ=engine torque/(engine speed)$^2$); Ne is the engine speed; and t is the torque ratio of the torque converter 2 (t=turbine torque/engine torque).

The torque converter capacity coefficient τ and torque ratio t depend on a speed ratio of the torque converter 2 given by the periodically detected engine speed Ne and the turbine speed Nt at the completion of engagement of the start clutch. The calculation of the transmission input torque using these torque converter capacity coefficient τ and torque ratio t enables accurate hydraulic pressure control for engagement of the start clutch.

At step S202, the hydraulic control unit 9 calculates, based on the calculated transmission input torque, a target value $P\_{target}$ of the clutch pressure required at the completion of engagement of the start clutch. In the present embodiment, the hydraulic control unit 9 determines a target torque capacity required to transmit the input torque upon engagement of the start clutch according to the following equation (3) and then determines, as the target clutch pressure value $P\_{target}$, a hydraulic pressure required to engage the start clutch while ensuring the target torque capacity.

$$\text{Target torque capacity} = \tau Ne^2 t \times G\_{100\%} \quad (3)$$

where $\tau Ne^2 t$ is the transmission input torque; and $G\_{100\%}$ is the value of the after-explained gain G at the time the shift progress degree is 100% (at the completion of engagement of the start clutch).

At step S203, the hydraulic control unit 9 refers to a memory and judges whether there is any previous calculation result of the target clutch pressure value $P\_{target}$ stored in the memory, i.e., confirms whether the target clutch pressure value $P\_{target}$ calculated in the current cycle of the engagement pressure control operation is the first calculation result after the judgment of initiation of engagement of the start clutch. If Yes at step S203, the control goes to step S204. If No at step S203, the control goes to step S205.

At step S204, the hydraulic control unit 9 updates the target clutch pressure value $P\_{target}$ by replacing the previous calculation result with the current calculation result. The control goes from step S204 to step S206.

At step S205, the hydraulic control unit 9 sets and stores the currently calculated target clutch pressure value $P\_{target}$. After that, the control goes to step S206.

As is generally known, the transmission input torque varies with the engine speed Ne etc. The torque capacity required for engagement of the start clutch also varies with the transmission input torque. In other words, the torque capacity required for engagement of the start clutch and the clutch pressure command value required to secure this required torque capacity become smaller as the transmission input torque decreases with the engine speed Ne.

Figure 5A:
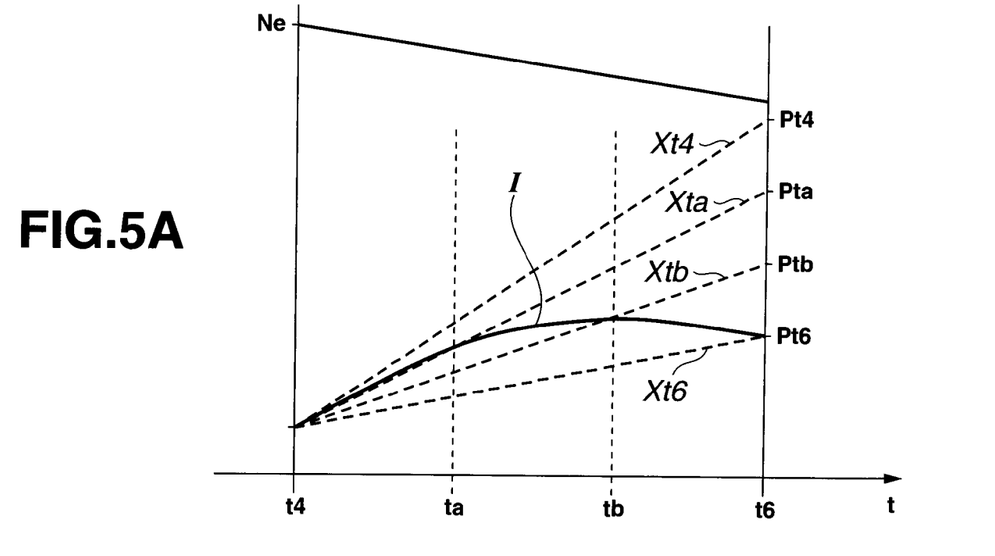
FIG. 5A is a graph showing how the hydraulic control device corrects a target pressure.

In the present embodiment, the target clutch pressure value $P\_{target}$ is updated periodically and repeatedly as explained above by repeated cycles of the engagement pressure control operation during the lapse of the target engagement period T1 from the engagement initiation time t4 to the engagement completion time t6. As shown in FIG. 5A, for example, the target clutch pressure value $P\_{target}$ is first set to a value Pt4 based on the transmission input torque at the engagement initiation time t4, updated to a value Pta based on the transmission input torque at a time ta, updated to a value Ptb based on the transmission input torque at a time tb, and then, updated to a value Pt6 based on the transmission input torque at the engagement completion time t6. In this way, the target clutch pressure value $P\_{target}$ is corrected appropriately in accordance with the current transmission input torque by repeated cycles of the engagement pressure control operation under the circumstance where the transmission input torque changes with the engine speed Ne during engagement of the start clutch.

At step S206, the hydraulic control unit 9 specifies a time period Tx elapsed from the engagement initiation time t4 until the current time based on the output of the timer Ta.

At step S207, the hydraulic control unit 9 determines a provisional command value of the clutch pressure based on the elapsed time period Tx.

In the present embodiment, the hydraulic control unit 9 first calculates a currently required torque capacity according to the following equation (4) and then calculates, as the provisional command value, a hydraulic pressure required to secure this calculated required torque capacity:

$$\text{Required torque capacity} = \{(\tau Ne^2 t \times G - T_{cl\_init})/T1\} \times Tx + T_{cl\_init} \quad (4)$$

where $\tau Ne^2 t$ is the transmission input torque; G is the gain explained below; Tx is the elapsed time period from the engagement initiation time t4; $T_{cl\_init}$ is the toque capacity required to provide a command value $P\_{init}$ of the clutch pressure at the engagement initiation time t4 (hereinafter referred to as "engagement initiation pressure value"); and T1 is the target engagement period from the engagement initiation time t4 to the engagement completion time t6.

The equation (4) defines a line segment whose slope corresponds to a first rate of change of the toque capacity required for changing the clutch pressure (or equivalently, the clutch pressure command value) from the engagement initiation pressure value $P\_{init}$ to the target clutch pressure value $P\_{target}$ during the target engagement period T1. The currently required torque capacity can be thus calculated according to the equation (4) as a function of the elapsed time period Tx.

More specifically, the term $\{(\tau Ne^2 t \times G - T_{cl\_init})/T1\}$ of the equation (4) represents the first change rate for changing the clutch pressure from the engagement initiation pressure value $P\_{init}$ to the target clutch pressure value $P\_{target}$ during the target engagement period T1. The first change rate thus varies depending on the target clutch pressure value $P\_{target}$. As shown in FIG. 5A, for example, the first change rate is defined by a line segment Xt4 when the target clutch pressure value $P\_{target}$ is set to Pt4 at the engagement initiation time t4, defined by a line segment Xta when the target clutch pressure value $P\_{target}$ is corrected to Pta at the time ta, defined by a line segment Xtb when the target clutch pressure value $P\_{target}$ is corrected to Ptb at the time tb, and then, defined by a line segment Xt6 when the target clutch pressure value $P\_{target}$ is corrected to Pt6 at the engagement completion time t6. Every time the target clutch pressure value $P\_{target}$ is corrected, the first change rate is corrected according to the corrected target clutch pressure value $P\_{target}$. As a result, the clutch pressure command value is changed to the target clutch pressure value $P\_{target}$ along a line segment I as shown in FIG. 5A.

Further, the gain G corresponds to a coefficient for correcting the calculated torque capacity and thereby adjusting the clutch pressure command value. The gain G varies depending on the shift progress degree (engagement progress degree) so as to take on the smallest value in the initial stage of engagement and increase gradually as close to the terminal stage of engagement. In the initial stage of engagement, the engine speed Ne is relatively high so that the gain G is set small in order to prevent the clutch pressure command value from becoming too large. The gain G is set larger in the terminal stage of engagement than in the initial stage of engagement in order to determine the clutch pressure command value sufficient to engage the start clutch while ensuring the required torque capacity. By the application of this gain G to the provisional command value, the provisional command value is set to an appropriate value depending on the shift progress degree (engagement progress degree). In the present embodiment, the hydraulic control unit 9 stores data defining a relationship of the gain G and the shift progress degree (engagement progress degree) in the memory and specifies the current value of the gain G according to the shift progress degree with reference to the data. This data is set in advance based on the result of experimental adaptability test etc. in consideration of the engagement shock and response.

At step S208, the hydraulic control unit 9 determines a lower limit of the clutch pressure command value based on the elapsed time period Tx.

In the present embodiment, the hydraulic control unit 9 first calculates a lower limit of the torque capacity according to the following equation (5) and then calculates, as the lower limit command value, a hydraulic pressure required to secure this calculated torque capacity limit:

$$\text{Lower torque capacity limit} = (\tau Ne^2 t \times G\_{100\%}/T1) \times Tx \quad (5)$$

where $\tau Ne^2 t$ is the transmission input torque; $G\_{100\%}$ is the value of the above-explained gain G at the time the shift progress degree is 100% (at the completion of engagement of the start clutch); Tx is the elapsed time period from the engagement initiation time t4; and T1 is the target engagement period from the engagement initiation time t4 to the engagement completion time t6.

The equation (5) defines a line segment whose slope corresponds to a second rate of change of the toque capacity required for changing the clutch pressure (or equivalently, the clutch pressure command value) from a minimum value $P\_{ret}$ of the clutch pressure required for engagement of the start clutch to the target clutch pressure value $P\_{target}$ during the target engagement period T1. The lower torque capacity limit can be thus calculated according to the equation (5) as a function of the elapsed time period Tx.

Figure 5B:
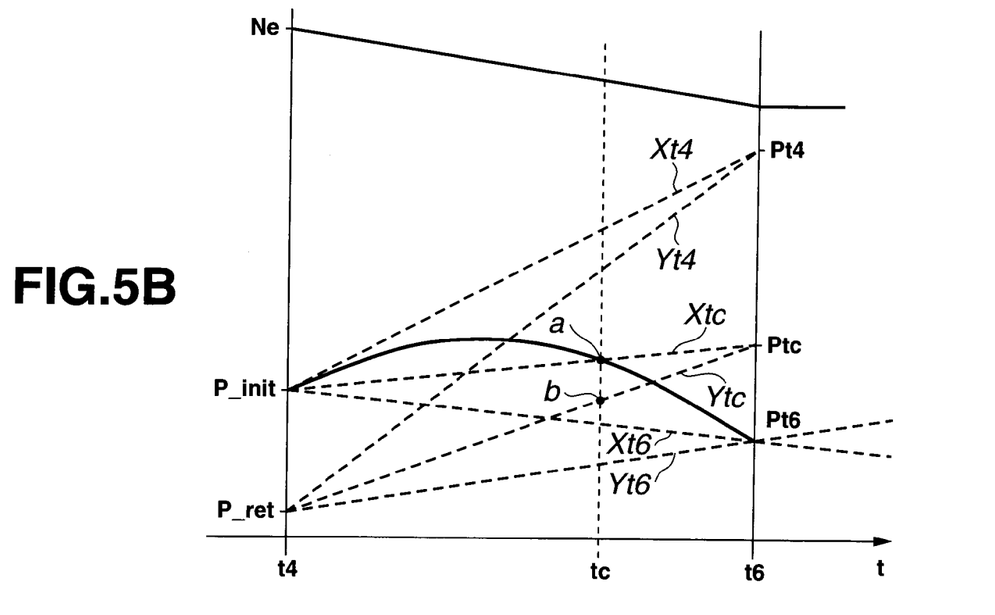
FIG. 5B is a graph showing how the hydraulic control device corrects sets first and second change rates.

More specifically, the term $(\tau Ne^2 t \times G\_{100\%})/T1$ of the equation (5) represents the second change rate for changing the clutch pressure from the minimum required clutch pressure value $P\_{ret}$ to the target clutch pressure value $P\_{target}$ during the target engagement period T1. The second change rate also varies depending on the target clutch pressure value $P\_{target}$. As shown in FIG. 5B, for example, the second change rate is defined by a line segment Yt4 when the target clutch pressure value $P\_{target}$ is set to Pt4 at the engagement initiation time t4, defined by a line segment Ytc when the target clutch pressure value $P\_{target}$ is corrected to Ptc at the time tc, and then, defined by a line segment Yt6 when the target clutch pressure value $P\_{target}$ is corrected to Pt6 at the engagement completion time t6. Every time the target clutch pressure value $P\_{target}$ is corrected, the second change rate is corrected according to the corrected target clutch pressure value $P\_{target}$.

The minimum required clutch pressure value $P\_{ret}$ means a minimum hydraulic pressure required to move the piston in the direction that engages the start clutch against the biasing force of the return spring (i.e. a minimum hydraulic pressure required to apply as large a force to the piston as the load exerted by the return spring). Namely, the minimum required clutch pressure value $P\_{ret}$ is lower than the target clutch pressure value $P\_{target}$ (=Pt6) at the engagement initiation time t6 so that the second change rate is always positive in sign as indicated by the ling segment Yt4, Ytc, Yt6 regardless whether the target clutch pressure value $P\_{target}$ becomes decreased after the initiation of engagement of the start clutch.

The lower limit command value is set higher than or equal to this minimum required clutch pressure value $P\_{ret}$ so as to secure the stroke of the piston up to its engagement initiation position. Further, the lower limit command value is set to an appropriate value so as to eliminate the effect of variations in hydraulic pressure etc. and bring the start clutch into engagement assuredly at the engagement completion time t6 by the application of the gain $G\_{100\%}$ to the lower limit command value.

At step S209, the hydraulic control unit 9 judges whether the provisional command value is higher than the lower limit command value. If Yes at step S209, the control goes to step S210. If No at step S209, the control goes to step 211.

At step S210, the hydraulic control unit 9 selects the provisional command value as the current clutch pressure command value.

At step S211, the hydraulic control unit 9 selects the lower limit command value as the current clutch pressure command value.

At the time tc in FIG. 5B, for example, the hydraulic control unit 9 determines a provisional pressure command value a according to the first change rate defined by a line segment Xtc and the elapsed time period from the engagement initiation time t4 to the time tc, determines a lower limit command value b according to the second change late defined by a line segment Ytc and the elapsed time period from the engagement initiation time t4 to the time tc and selects the higher value of the provisional pressure command value a and the lower limit command value b. In FIG. 5B, the provisional pressure command value a is selected as the current final clutch pressure command value since the provisional pressure command value a is higher than the lower limit command value b.

Under the circumstance where the transmission input torque largely decreases during the target engagement period T1, however, the target clutch pressure value $P\_{target}$ may be corrected to such a low level that the first change rate becomes negative (minus) in sign at the engagement completion time t6 as indicated by a line segment Xt6 in FIG. 5B. In such a case, the selection of the provisional command value as the current clutch pressure command value brings about a negative change rate for the clutch pressure command value so that the clutch pressure command value keeps on decreasing after the engagement completion time t6 even if the start clutch does not come into engagement at the engagement completion time t6 due to variations in hydraulic pressure etc. This results in incomplete engagement of the start clutch.

By contrast, the second change rate remains positive (plus) in sign as explained above even when the target clutch pressure value $P\_{target}$ largely decreases with the transmission input torque during the target engagement period T1. The selection of the lower limit command value, in place of the provisional command value, as the current clutch pressure command value finally ensures a positive change rate for the clutch pressure command value. The clutch pressure command value can be thus prevented from decreasing after the lapse of the target engagement period T1 so as to avoid the occurrence of engagement failure of the start clutch effectively.

At step S212, the hydraulic control unit 9 outputs a command signal to the solenoid 8 such that the solenoid 8 operates the pressure regulator valves to regulate the hydraulic pressure supply to the start clutch according to the clutch pressure command value. After that, the control goes to step S106 in FIG. 2.

At step S106, the hydraulic control unit 9 judges whether the engagement of the start clutch has been completed. In the present embodiment, the hydraulic control unit 9 multiplies a difference between the turbine speed Nt and the transmission output shaft speed To by the gear ratio to determine a comparison value T=(Nt−No)×(gear ratio) and, when the determined comparison value T is smaller than a threshold value β, judges that the engagement of the start clutch has been completed. If Yes at step S106, the control goes to step S107. If No at step S106, the control goes back to step S105.

At step S107, the hydraulic control unit 9 judges whether a timer Tb has been started to confirm the lapse of the engagement securing time period T2 from a time t5 of judgment of completion of engagement of the start clutch. If No at step S107, the control goes to step S108. If Yes at step S107, the control goes to step S109.

At step S108, the hydraulic control unit 9 starts the timer Tb.

At step S109, the hydraulic control unit 9 specifies a time period Ty elapsed from the engagement completion judgment time t5 up to the current time based on the output of the timer Tb and judges whether the elapsed time period Ty reaches the engagement securing time period T2. If Yes at step S109, the control goes to step S110. If No at step S109, the control goes back to step S105.

At step S110, the hydraulic control unit 9 performs a full clutch engagement control operation to bring the start clutch into full engagement.

In the full clutch engagement control operation, the hydraulic control unit 9 increases the clutch pressure command value at a given gradient during the lapse of a predetermined time period from the engagement judgment time t6 until a time t7 of completion of the full clutch engagement control operation, increases the clutch pressure command value to a line pressure at the full engagement completion time t7, and then, holds the clutch pressure command value at the line pressure from the full engagement completion time 7 onward.

As described above, the hydraulic control device of the present embodiment has: a target pressure setting section or means (steps S201 to S205) that, when the shift lever is moved from the N range position to the D range position, calculates the target clutch pressure value $P\_{target}$ based on the transmission input torque and corrects the target clutch pressure value $P\_{target}$ periodically according to the transmission input torque during the target engagement period T1 from the engagement initiation time t4 to the engagement completion time t6; and a hydraulic pressure control section or means (step S212) that controls the clutch pressure according to the clutch pressure command value in such a manner that the clutch pressure reaches the corrected target clutch pressure value $P\_{target}$ at the engagement completion time t6.

The conventional hydraulic control device does not consider the case where the engine speed decreases after the setting of the hydraulic pressure increase rate of the vehicle start-up engagement element as mentioned before and thus does not decrease its hydraulic pressure command value during engagement of the vehicle start-up engagement element even if the transmission input torque varies with the engine speed after the setting of the hydraulic pressure increase rate. This can result in an engagement shock due to excessive hydraulic pressure supply.

By contrast, the hydraulic control device of the present embodiment corrects the target clutch pressure value $P\_{target}$ periodically in response to changes in the transmission input torque during the target engagement period T1 and decreases the clutch pressure command value according to the corrected target clutch pressure value $P\_{target}$. It is therefore possible to supply a proper amount of hydraulic pressure to the start clutch and bring the start clutch into engagement at the target engagement completion time t6 without causing a large engagement shock even under the circumstance where the transmission input torque changes with the engine speed Ne during engagement of the start clutch.

The hydraulic control device of the present embodiment also has: a change rate setting section or means (steps S206 to S208) that sets the change rate of the torque capacity required for increasing the clutch pressure to the target clutch pressure value $P\_{target}$ during the target engagement period T1 and corrects the change rate upon correction of the target clutch pressure value $P\_{target}$; and a command pressure setting section or means (steps S209 to S211) that calculates the currently required torque capacity based on the corrected torque change rate and the elapsed time period and sets the clutch pressure command value according to the calculated torque capacity. As the correction of the target clutch pressure value $P\_{target}$ is reflected through the clutch pressure command value, it is possible to engage the start clutch by a proper hydraulic pressure supply and secure the required torque capacity at the completion of engagement of the start clutch.

In the present embodiment, in particular, the change rate setting section or means sets the first change rate for increasing the clutch pressure from the engagement initiation pressure value $P\_{init}$ to the target clutch pressure value $P\_{target}$ during the target engagement period T1 and the second change rate for increasing the clutch pressure from the minimum required clutch pressure value $P\_{ret}$ to the target clutch pressure value $P\_{target}$ during the target engagement period T1. Then, the command pressure setting section or means calculates the provisional pressure command value (as a first command value) based on the first change rate and the elapsed time period, calculates the lower limit command value (as a second command value) based on the second change rate and the elapsed time period, and then, selects the higher value of the provisional pressure command value and the lower limit command value as the current final clutch pressure command value. For example, when the provisional pressure command value (indicated by a solid line U) remains higher than the lower limit command value (indicated by a dotted line L) as shown in FIG. 3 under circumstance where the transmission input torque decreases during the target engagement period T1, the provisional pressure command value is selected as the clutch pressure command value so that the clutch pressure command value changes along the solid line U. When the provisional pressure command value becomes lower than the lower limit command value, the lower limit command value is selected as the clutch pressure command value so as to ensure a positive change rate for the clutch pressure command value as explained above. It is thus possible to prevent the clutch pressure command value from decreasing after the engagement completion time t6 the and bring the start clutch into engagement properly and assuredly even if the start clutch does not come into engagement at the engagement completion time t6 due to variations in hydraulic pressure etc. It is also possible to secure the stroke of the piston up to its engagement initiation position for engagement of the start clutch as the lower limit command value assures the minimum required clutch pressure value $P\_{ret}$ (i.e. minimum hydraulic pressure required to apply as large a force to the piston as the load exerted by the return spring).

Further, the command pressure setting section or means calculates the provisional command value and the lower limit command value by applying thereto the gain G and the gain $G\_{100\%}$, respectively, according to the equations (4) and (5). This makes it possible to adjust the clutch pressure command value as appropriate depending on the shift progress degree (engagement progress degree) and to bring the start clutch into engagement assuredly at the engagement completion time t6 without the effect of hydraulic pressure variations as explained above.

The target pressure setting section or means determines the transmission input torque according to the equation (2) using the torque converter capacity coefficient τ and torque ratio t. This enables accurate hydraulic pressure control for engagement of the start clutch since the torque converter capacity coefficient τ and torque ratio t depend on the torque converter speed ratio given by the periodically detected engine speed Ne and the turbine speed Nt at the completion of engagement of the start clutch.

The entire contents of Japanese Patent Application No. 2008-148896 (filed on Jun. 6, 2008) are herein incorporated by reference.

Although the present invention has been described with reference to the above-specific embodiment of the invention, the invention is not limited to this exemplary embodiment. Various modification and variation of the embodiment described above will occur to those skilled in the art in light of the above teachings.

The gain G may alternatively be decreased with the progress of engagement of the start clutch in order to set the clutch pressure command value that brings the clutch into engagement quickly in the initial stage of engagement and brings the clutch into engagement smoothly in the terminal stage of engagement although the gain G is increased with the progress of engagement of the start clutch in order to prevent the clutch pressure command value from becoming too large in the initial stage of engagement and to determine the sufficient clutch pressure command value to engage the start clutch and secure the required torque capacity in the terminal stage of engagement.

The present invention can be applied to any other shift from the non-drive range position to the drive range position, e.g., shift from the N range to the R range, shift from the P range to the D range or shift from the P range to the R range although the above embodiment refers to the shift from the N range to the D range.

Furthermore, the present invention can be applied not only to the automatic transmission that achieves a desired gear range by selective engagement/disengagement of the transmission engagement elements 6 as in the above embodiment but also to a continuously variable transmission that engages a forward engagement element or reverse engagement element (as the vehicle start-up engagement element) upon selection of D range or R range.

The scope of the invention is defined with reference to the following claims.

What is claimed is:

1. A hydraulic control device for an automatic transmission, the automatic transmission having a vehicle start-up engagement element hydraulically engaged for vehicle start-up when a shift lever is moved from a non-drive range position to a drive range position, the hydraulic control device comprising:
   a target pressure setting section configured to, when the shift lever is moved from the non-drive range position to the drive range position, calculate a target value of hydraulic pressure to be supplied to the vehicle start-up engagement element at a completion of an engagement of the vehicle start-up engagement element based on a transmission input torque of the automatic transmission and to correct the target value periodically based on the transmission input torque until the completion of the engagement of the vehicle start-up engagement element; and
   a hydraulic pressure control section configured to control the hydraulic pressure in such a manner that the hydraulic pressure supplied to the vehicle start-up engagement element reaches the corrected target value at the completion of the engagement of the vehicle start-up engagement element.

2. The hydraulic control device according to claim 1, further comprising:
   a change rate setting section configured to set a change rate for changing the hydraulic pressure to the target value during a time period from an initiation of the engagement of the vehicle start-up engagement element to the completion of the engagement of the vehicle start-up engagement element; and
   a command pressure setting section configured to specify an elapsed time period from the initiation of the engagement of the vehicle start-up engagement element until a current time and to set a command value of the hydraulic pressure supplied to the vehicle start-up engagement element based on the change rate and the elapsed time period,
   wherein, when the target pressure setting section corrects the target value, the change rate setting section is configured to correct the change rate based on the corrected target value; the command pressure setting section is configured to set the command value based on the corrected change rate and the elapsed time period; and the hydraulic pressure control section is configured to control the hydraulic pressure according to the command value.

3. The hydraulic control device according to claim 2, wherein the change rate setting section is configured to set a first change rate for changing the hydraulic pressure from a value of the hydraulic pressure supplied to the vehicle start-up engagement element at the initiation of the engagement of the vehicle start-up engagement element to the target value during the time period from the initiation to the completion of engagement of the vehicle start-up engagement element and configured to set a second change rate for changing the hydraulic pressure from a minimum value of the hydraulic pressure required to move the vehicle start-up engagement element in an engagement direction thereof to the target value during the time period from the initiation to the completion of the engagement of the vehicle start-up engagement element; and
   wherein the command pressure setting section is configured to set a first command value of the hydraulic pressure supplied to the vehicle start-up engagement element based on the first change rate and the elapsed time period, to set a second command value of the hydraulic pressure supplied to the vehicle start-up engagement element based on the second change rate and the elapsed time period, and to select a higher value of the first command value and the second command value as a current command value.

4. The hydraulic control device according to claim 3, wherein the command pressure setting section is configured to set the first command value by applying thereto a gain that depends on a degree of engagement of the vehicle start-up engagement element and to set the second command value by applying thereto a value of the gain at the completion of the engagement of the vehicle start-up engagement element.

5. The hydraulic control device according to claim 1, wherein the automatic transmission has an input shaft connected to an engine via a torque converter; and
   wherein the target pressure setting section is configured to determine the transmission input torque based on a periodically detected engine speed, a capacity coefficient, and a torque ratio of the torque converter that depends on a speed ratio of the torque converter given by the engine speed, and a turbine speed of the automatic transmission at the completion of the engagement of the vehicle start-up engagement element.

6. A hydraulic control method for an automatic transmission, the automatic transmission having a vehicle start-up engagement element hydraulically engaged for vehicle start-up when a shift lever is moved from a non-drive range position to a drive range position, the hydraulic control method comprising:
   when the shift lever is moved from the non-drive range position to the drive range position, setting a target value of hydraulic pressure to be supplied to the vehicle start-up engagement element at a completion of an engagement of the vehicle start-up engagement element based on a transmission input torque of the automatic transmission and correcting the target value periodically based on the transmission input torque until the completion of the engagement of the vehicle start-up engagement element; and controlling the hydraulic pressure in such a manner that the hydraulic pressure supplied to the vehicle start-up engagement element reaches the corrected target value at the completion of the engagement of the vehicle start-up engagement element.

* * * * *